No. 749,694. PATENTED JAN. 12, 1904.
H. W. LADD.
MEANS FOR DETERMINING THE NAUTICAL BEARING OF NAVIGABLE VESSELS.
APPLICATION FILED APR. 22, 1901.
NO MODEL.
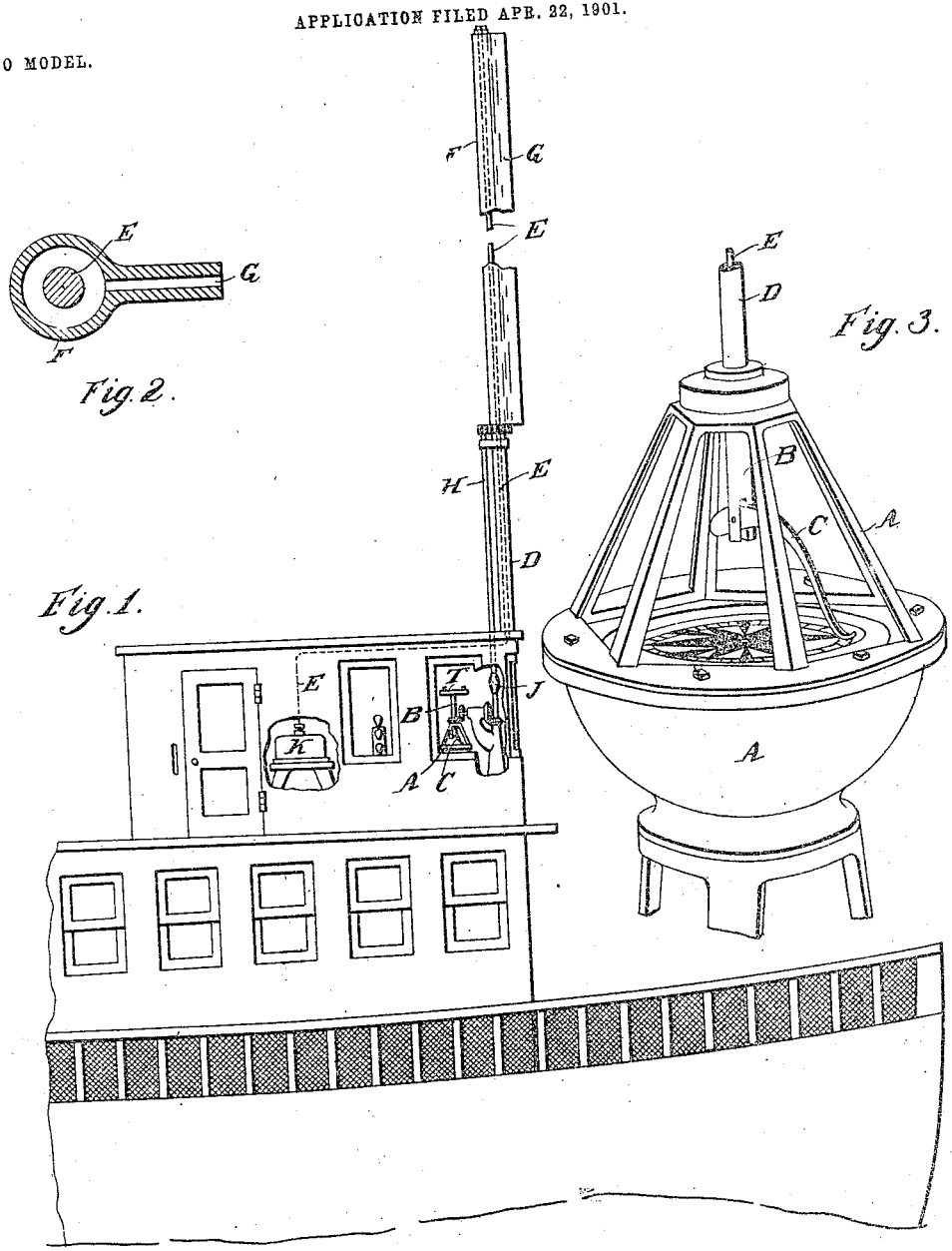

No. 749,694.

Patented January 12, 1904.

UNITED STATES PATENT OFFICE.

HERMON W. LADD, OF BOSTON, MASSACHUSETTS, ASSIGNOR TO GEORGE E. SMITH, TRUSTEE, OF EVERETT, MASSACHUSETTS.

MEANS FOR DETERMINING THE NAUTICAL BEARING OF NAVIGABLE VESSELS.

SPECIFICATION forming part of Letters Patent No. 749,694, dated January 12, 1904.

Original application filed May 15, 1899, Serial No. 716,853. Divided and this application filed April 22, 1901. Serial No. 56,814.

(No model.)

*To all whom it may concern:*

Be it known that I, HERMON W. LADD, of Boston, in the county of Suffolk and State of Massachusetts, have invented certain new and useful Improvements in Means for Determining the Nautical Bearing of Navigable Vessels, of which the following is a specification.

My invention is an improvement in means for determining the bearings of navigable vessels under all conditions of weather, the object being to provide improved indicating devices for use with a ship's compass and the usual sailing-charts, whereby the bearings of known objects at a distance from the ship may be positively determined at times when owing to fog or storm the landmarks may be invisible.

My invention is based upon the scientific fact recently demonstrated by Marconi and others that so-called "Hertzian-wave" impulses or signals may be conveyed over long distances without connecting-wires. I utilize this principle by means of my apparatus to determine the position of the ship with relation to known landmarks, and thus render navigation safer and avoid the delays in the movement of vessels caused by foggy or stormy weather when the usual sight observations cannot be taken.

My apparatus, carried on the ship, is applied to or connected with the binnacle, which incloses the ship's compass; and it consists, primarily, of a receiving instrument electrically connected with an upright conductor so shielded that it can only receive the said wave, impulse, or signal (coming from a transmitting-station or shore or from another ship or lightship) through a lateral opening or slot when such exposure is in proper range radially with said ship or shore station. I surround the conductor by a rotatable shield, cap, or tube slotted vertically to admit the wave or impulse from a given station at such time only in its rotation as the slot or opening is approximately between said station and the inclosed conductor. With this apparatus or its equivalent when used on shipboard I employ a rotatable pointer extending over and close to the compass, always in the same radial vertical plane as said slot or exposure, to indicate on the face of the compass the bearing of the station from which emanates the signal or impulse reaching the receiving instrument through such slot or exposure.

With my system of taking bearings each lighthouse and prominent landmark will have a distinctive name or number by which it is known and designated on sailing-charts, and each will be provided with a transmitting instrument adapted to continually repeat its name or number or to automatically transmit such impulse, wave, or signal as shall make the identity of the station certain. Then when a ship appears off the coast provided with my receiver and compass attachments the elevated conductor receives through the slot of its rotating and intermittingly-acting shield the impulse sent seaward from the transmitting-stations, and the navigator notes at once on his chart the bearing of said station as denoted on his compass-dial by the indicating-pointer. From another shore-station he receives a different signal, and by the cross-bearings thus secured he obtains his reckoning, showing exactly where on the chart his ship should be. A transmitting instrument on the ship will at such times be able to communicate with the shore-station, thus making its presence and its exact location known.

In the drawings, Figure 1 is a representation of part of a ship having my apparatus applied to and in the pilot-house. Fig. 2 is an enlarged cross-section of the rotatable slotted shield or cap which surrounds the conductor. Fig. 3 is an enlarged view of the binnacle, with the compass and the indicator inclosed therein.

A represents the binnacle, which incloses the ship's compass, suspended in the usual way.

B is a vertical rotatable shaft mounted in a bearing in the top of the binnacle and extending down toward the center of the compass.

C is a radial indicating-pointer extending from the foot of shaft B outwardly to the margin of the compass-dial.

D represents a vertical supporting-tube inclosing and effectually protecting the lower part of the wave-catching conductor E, which extends upwardly to a considerable height above the ship's deck, so as to come within the sphere of influence of a wave-transmitting instrument located in a station many miles away. The tube D is permanently erected, with the wave-catching conductor E located within it and protruding above its top. A rotatable shield or cap F is mounted on the top of the supporting and protecting tube D and surrounds the bare protruding upper end of the vertical conductor E. An elongated vertical slot G on one side of said cap admits the Hertzian or ether waves coming from the transmitters to contact with the bare conductor within the slotted shield or cap whenever in its rotation the slot comes between the conductor and transmitter. As herein illustrated, the slot G is narrow and its walls are shown extended well out from the conductor, so that said waves, coming in direct radial lines, most effectively reach the conductor from a point of the compass approximately defined by the radial direction of the slot-walls, which will be the same as that denoted on the compass-dial by the indicating-pointer C.

The protecting and supporting tube D and the rotatable slotted shield F, which surround the conductor E, will be of durable material, opaque or impervious to the Hertzian waves, preferably of a reasonable thickness of copper. The relative length of the stationary tube D and the rotating shield F will be so proportioned as to secure the most effective action of the apparatus.

Any convenient means for rotating the slotted shield or cap F in unison with the arm C may be adopted. The devices shown in Fig. 1 are suitable, and consist of a vertical rod H, parallel to the protecting-tube D, mounted in bearings and having a geared connection at top with the slotted shield or cap and at bottom with the binnacle-shaft B, which carries said arm. The rod H is provided with a hand-wheel or ball J, by which it may be rotated by the operator, or it may be driven by any electrical or mechanical means. The conductor E extends from the slotted shield or cap F, as shown by dotted lines in Fig. 1, into the pilot-house, and the receiving instrument K records the signal received in accordance with the Marconi system or otherwise.

By providing each ship with transmitting and receiving apparatus and with my rotatable devices connected to the binnacle it becomes possible for such ships to communicate with each other and also to determine from the compass of any ship during fog or storm the direction therefrom of a ship sending out signals of distress or otherwise.

I prefer to furnish with my described apparatus a sighting-tube T, Fig. 1, mounted on the binnacle-shaft B in the plane of the pointer C or parallel thereto, so as to provide also for sight observations when the weather conditions are favorable therefor.

I do not limit myself to the specified devices or the proportions or form of apparatus herein illustrated and described, for it is obvious that many changes in details may be made without departing from the spirit of my invention relating to determining bearings of ships for navigation, as herein disclosed.

I do not claim the discovery of the principle of signaling by Hertzian or ether waves without connecting-wires, nor, broadly, the transmission of intelligence between ship and shore or between different ships in that manner, but rather the described means, or the mechanical equivalent thereof, by which such signals or waves emitted from points on ship or shore are received on shipboard by an apparatus in conjunction with the ship's compass and having a rotatable part adapted to receive the signals or waves intermittently and from one direction only at any given time and to indicate that direction on the compass-dial.

I do not herein claim the improvement in the art or method of transmitting and receiving signals by means substantially as described, such art or method being set forth and claimed in my application, Serial No. 716,853, filed May 15, 1899, of which my present application is a division.

I claim as my invention—

1. Means for receiving Hertzian-wave signals and messages, comprising a wave-catching conductor, in combination with a shield open on one side to expose said conductor to the transmitted waves in certain directions, and closed on its other sides to shield the conductor therefrom in other directions, for the purpose set forth.

2. Means for transmitting and receiving Hertzian-wave signals and messages, comprising a wave-catching conductor, in combination with a movable shield adapted to alternately expose said conductor to and shield it from the influence of said waves, for the purpose set forth.

3. Hertzian-wave transmitting and receiving apparatus having elevated signal-conductors, in combination with a rotatable shield formed with an elongated vertical slot, adapted to expose said conductor to the signaling waves or impulses from the transmitter, only when the slotted portion of said shield is turned toward said transmitter, for the purpose set forth.

4. Hertzian-wave transmitting and receiving apparatus having elevated signal-conductors, in combination with a rotatable shield formed with an elongated vertical slot, adapted to expose said conductor to the signaling waves or impulses from the transmitter, only when the slotted portion of said shield is turned toward said transmitter, and with an indicating device in the same radial plane with said slot, and rotating in unison with said shield for the purpose set forth.

5. Hertzian-wave transmitting and receiving apparatus having wave-catching conductors, in combination with a rotatable shield formed with an elongated vertical slot having walls materially extended, radially, therefrom, to more accurately determine the nautical bearing of the transmitting instrument, and adapted to expose said conductor to the signaling waves or impulses, only when the slotted portion of said shield is turned toward the transmitter emitting said signal-waves, for the purpose set forth.

In testimony whereof I have affixed my signature in presence of two witnesses.

HERMON W. LADD.

Witnesses:
A. H. SPENCER,
A. W. BURMON.